(12) United States Patent
Hou (10) Patent No.: US 12,104,662 B1
(45) Date of Patent: Oct. 1, 2024

(54) COUPLING

(71) Applicant: Cheng-Jiang Hou, Kaohsiung (TW)

(72) Inventor: Cheng-Jiang Hou, Kaohsiung (TW)

(*) Notice: Subject to any disclaimer, the term of this patent is extended or adjusted under 35 U.S.C. 154(b) by 0 days.

(21) Appl. No.: 18/465,521

(22) Filed: Sep. 12, 2023

(51) Int. Cl.
*F16D 33/20* (2006.01)

(52) U.S. Cl.
CPC .................... *F16D 33/20* (2013.01)

(58) Field of Classification Search
CPC .......... F16D 33/20; F16D 33/08; F16D 33/02; F16H 61/48
See application file for complete search history.

(56) References Cited

U.S. PATENT DOCUMENTS

| | | | |
|---|---|---|---|
| 2,154,882 A | 4/1939 | Yoxall | |
| 4,581,892 A * | 4/1986 | Ahrens | F16D 33/10 60/330 |
| 4,761,952 A * | 8/1988 | Holler | F16D 33/06 60/330 |
| 5,251,441 A * | 10/1993 | Eon | F16D 33/06 60/330 |
| 5,465,575 A | 11/1995 | Shimmell | |
| 6,116,024 A * | 9/2000 | Rottino | F16H 41/24 192/69.82 |
| 2009/0113885 A1 | 5/2009 | Wang et al. | |
| 2018/0355882 A1 | 12/2018 | Ishii et al. | |

FOREIGN PATENT DOCUMENTS

| | | | | |
|---|---|---|---|---|
| CN | 206339379 U | * | 7/2017 | |
| CN | 113330232 A | | 8/2021 | |
| CN | 216199985 U | | 4/2022 | |
| CN | 115405640 A | | 11/2022 | |
| CN | 218235894 U | | 1/2023 | |
| DE | 102005004524 B3 | * | 5/2006 | ............. F16D 33/08 |
| EP | 1013954 A2 | * | 6/2000 | ............. F16D 33/08 |
| ES | 2433265 T3 | * | 12/2013 | ............. F16D 33/08 |
| FR | 2676521 A1 | * | 11/1992 | ............. F16D 33/08 |
| JP | 3171802 U | | 11/2011 | |

* cited by examiner

*Primary Examiner* — Thomas E Lazo
(74) *Attorney, Agent, or Firm* — RABIN & BERDO, P.C.

(57) ABSTRACT

A coupling has a housing and a returning unit and a turbo fan coaxially disposed within the housing. The housing has a first shell and a second shell coaxially connected to the first shell. The first shell has multiple driving ribs therein. Each driving rib has a guiding plate, a driving plate connected to the guiding plate, and an included angle defined between the driving plate and the guiding plate of the driving rib. The second shell has multiple divergent ribs therein. Fluid introduced into the housing is guided to the multiple driving ribs of the first shell via the divergent ribs of the second shell. The fluid pushes the driving plate of each driving rib and facilitates the housing to spin and drive a driven device. Therefore, the coupling of the present invention can save energy consumption for driving a driven device.

20 Claims, 9 Drawing Sheets

COUPLING

BACKGROUND OF THE INVENTION

1. Field of the Invention

The present invention relates to a device for energy conservation, and more particularly to a coupling able to save consumption of energy.

2. Description of Related Art

Couplings are commonly used in the industry for linking a driving device and a driven device. The coupling between the driving device and the driven device not only provides power transmission, but also prevents center deviation between the driving device and the driven device.

Meanwhile, some equipment in the heavy industry such as high-speed powder conveying device, with high load or high speed, need to be driven with horsepower up to 3,600 rpm. In addition, the equipment for conveying air in buildings also consumes a lot of energy to operate.

However, conventional couplings are merely responsible for power transmission, and even cause power loss in the process of power transmission. Therefore, the conventional coupling needs to be improved.

SUMMARY OF THE INVENTION

The main objective of the present invention is to provide a coupling that can be pushed and rotate to facilitate driving a driven device for saving energy consumption.

A coupling has a housing and a returning unit and a turbo fan coaxially disposed within the housing. The housing has a first shell and a second shell coaxially connected to the first shell. The first shell has multiple driving ribs therein. Each driving rib has a guiding plate, a driving plate connected to the guiding plate, and an included angle defined between the driving plate and the guiding plate of the driving rib. The second shell has multiple divergent ribs therein. Fluid introduced into the housing is guided to the multiple driving ribs of the first shell via the divergent ribs of the second shell. The fluid pushes the driving plate of each driving rib and facilitates the housing to spin and drive a driven device. Therefore, the coupling of the present invention can save energy consumption for driving a driven device.

Other objects, advantages, and novel features of the invention will become more apparent from the following detailed description when taken in conjunction with the accompanying drawings.

DETAILED DESCRIPTION OF PREFERRED EMBODIMENTS

With reference to FIGS. 1 to 7, a coupling, for linking a driving device and a driven device, in accordance with the present invention has a housing 10, a returning unit 20, and a turbo fan 30.

With reference to FIGS. 1 to 7, the housing 10 has a first shell 11 and a second shell 12. Wherein, the first shell 11 has a shell body 111, a first space 51, multiple driving ribs 112, and a first hole 113. The shell body 111 is a round cover. The first hole 113 is axially defined through a middle portion of the shell body 111. The first space S1 is disposed within the shell body 111 and between a rim of the shell body 11 and the first hole 113. The multiple driving ribs 112 are disposed in the first space S1 within the shell body 111 and surround the first hole 113. Each driving rib 112 extends from the rim of the shell body 111 toward the first hole 113 and has a guiding plate 114, a driving plate 115 connected to the guiding plate 114, and an included angle defined between the guiding plate 114 and the driving plate 115 of the driving rib 112. The included angle of each driving rib 112 is smaller than 180 degrees. A length of the guiding plate 114 of each driving rib 112 is longer than a length of the driving plate 115 of the driving rib 112. Preferably, the first shell 11 further has a first mediate plate 116 being circular, coaxially surrounding the first hole 113, connected to the multiple driving ribs 112, and convergent toward the first hole 113.

With reference to FIGS. 1 to 7, the second shell 12 has a shell body 121, a second space S2, multiple divergent ribs 122, and a second hole 123. The shell body 121 is a round cover. The second hole 123 is axially defined through a middle portion of the shell body 121. The second space S2 is disposed within the shell body 121 and between a rim of the shell body 121 and the second hole 123. The multiple divergent ribs 122 are disposed in the second space S2 within the shell body 121 and surround the second hole 123. Each divergent rib 122 spirally extends from the rim of the shell body 121 toward the second hole 123. A flowing channel formed between each adjacent two of the multiple divergent ribs 122 gradually diverges from the second hole 123 toward the rim of the shell body 121. The second shell 12 has a second mediate plate 124 corresponding to the first mediate plate 116 of the first shell 11. The second mediate plate 124 is also circular, coaxially surrounds the second hole 123, is connected to the multiple divergent ribs 122, and is convergent toward the second hole 123.

With reference to FIGS. 1 to 7, the returning unit 20 is coaxially disposed within the housing 10 and is surrounded by the multiple driving ribs 112. The returning unit 20 has a plate 21 and multiple guiding ribs 22. Wherein, the plate 21 has a conical surface, a communication hole 211, and multiple returning holes 212. The conical surface of the plate 21 faces to the second shell 12. The communication hole 211 is axially defined through a middle portion of the plate 21. The multiple returning holes 212 are radially defined through the plate 21.

Figure 1:
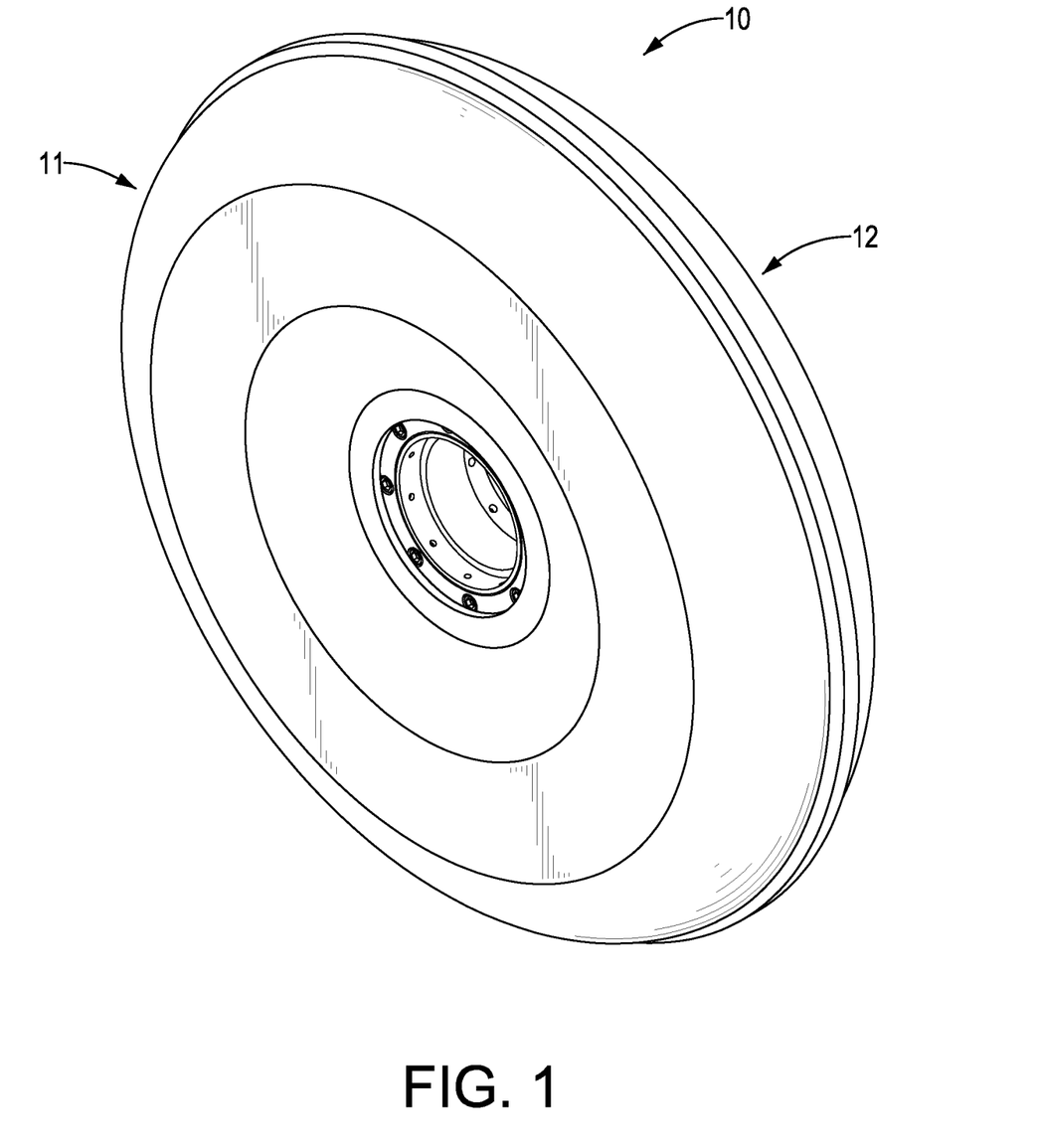
FIG. 1 is a perspective view of a coupling in accordance with the present invention.
Figure 2:
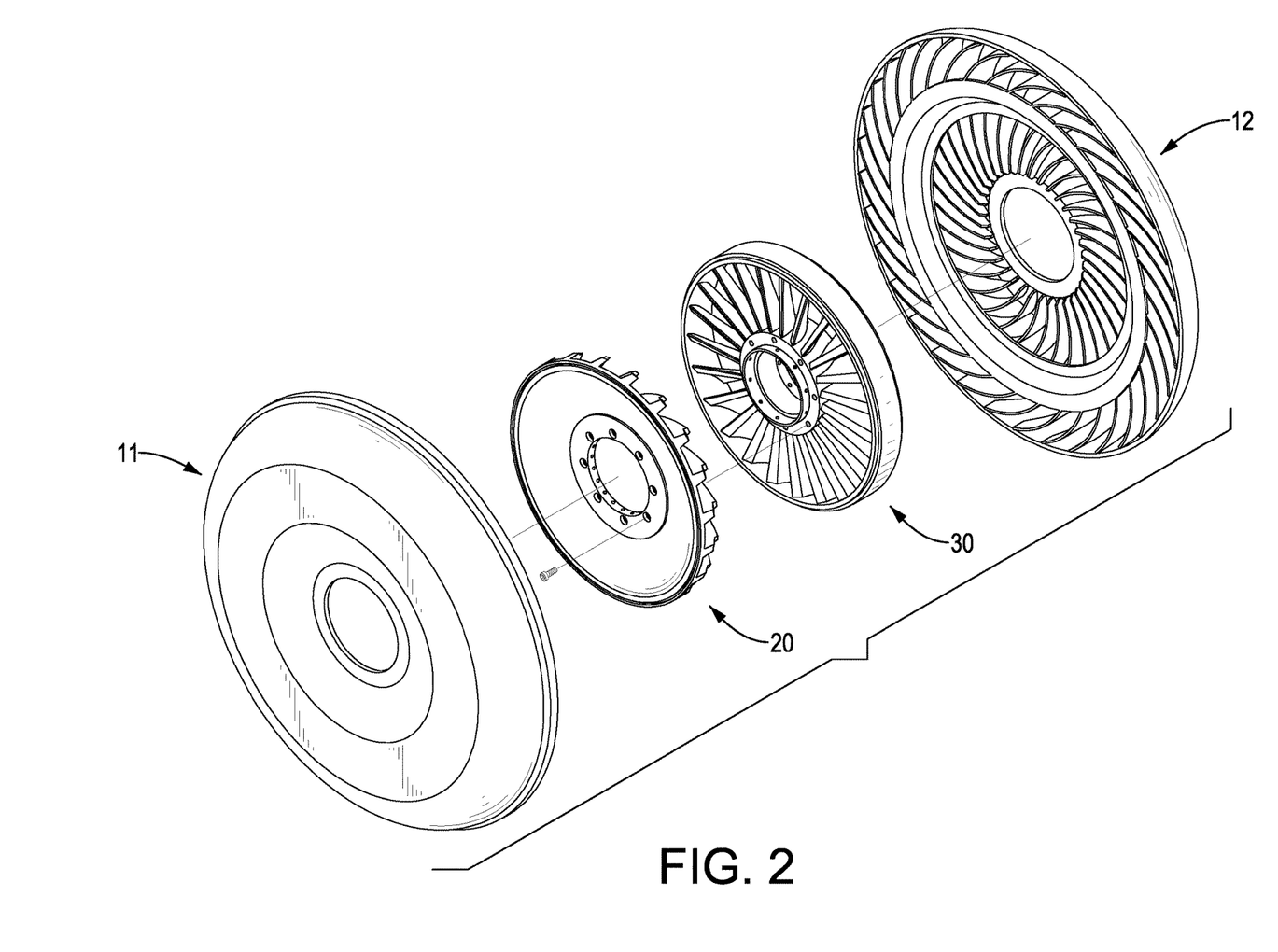
FIG. 2 is an exploded perspective view of the coupling in FIG. 1.
Figure 3:
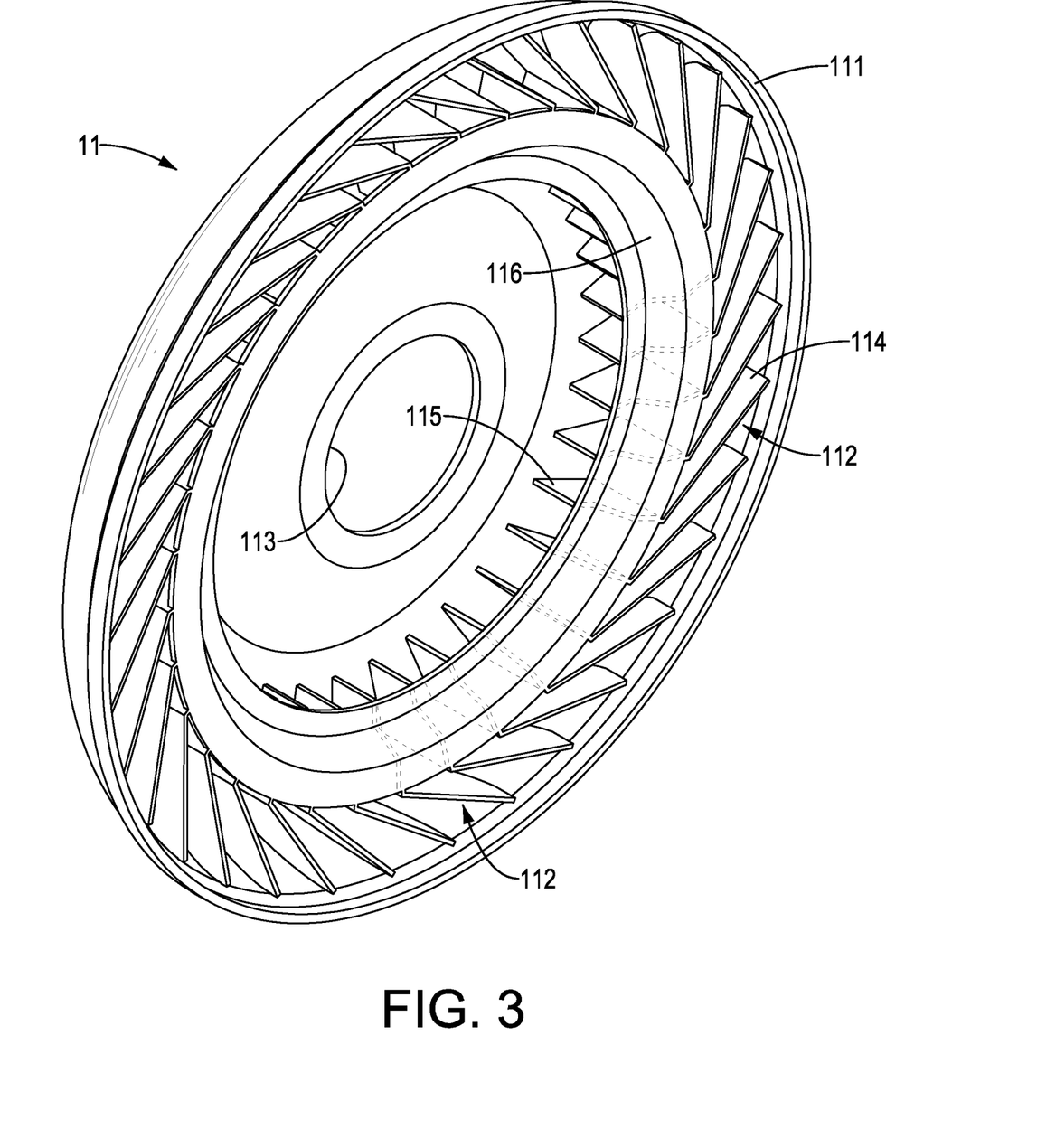
FIG. 3 is a perspective view of a first shell of the coupling in FIG. 1.
Figure 4:
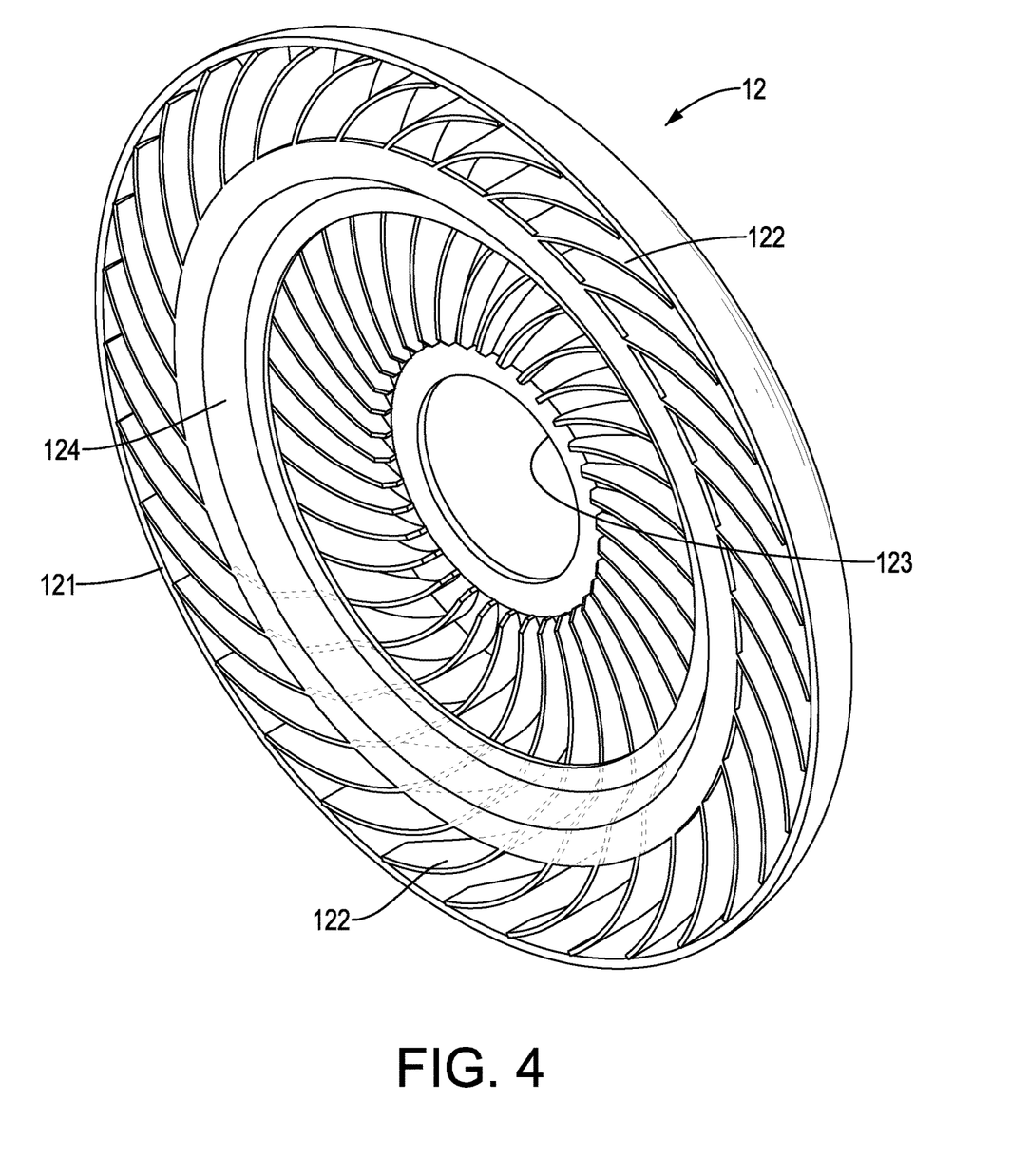
FIG. 4 is a perspective view of a second shell of the coupling in FIG. 1.
Figure 5:
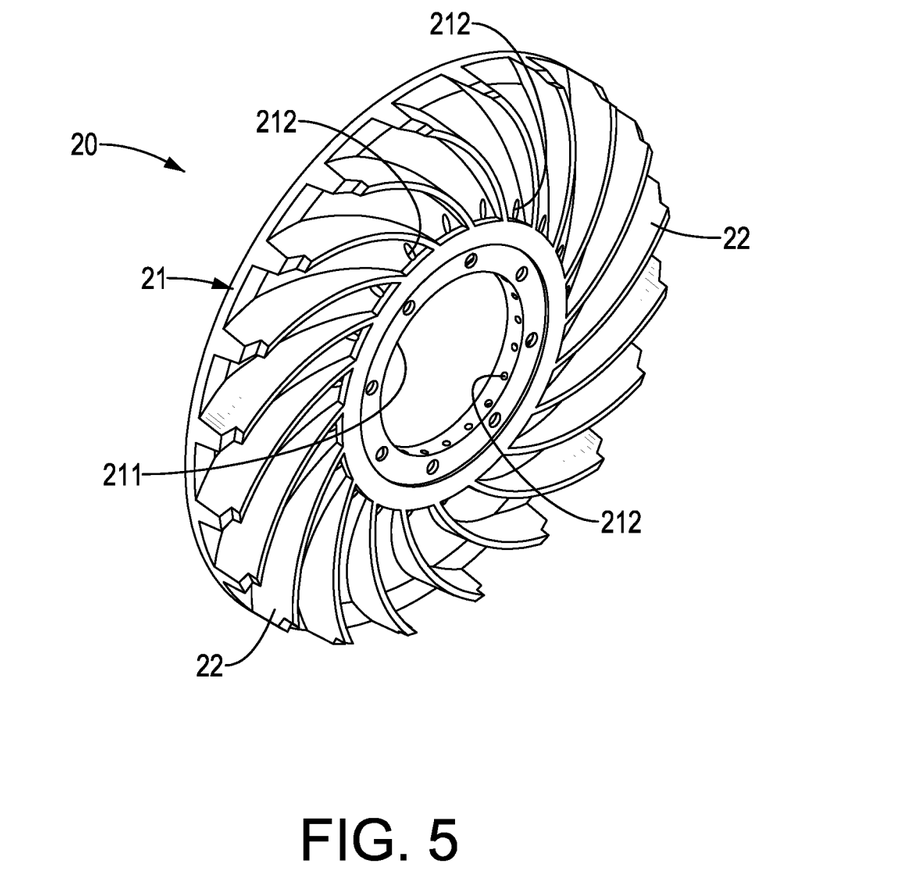
FIG. 5 is a perspective view of a returning unit of the coupling in FIG. 1.
Figure 6:
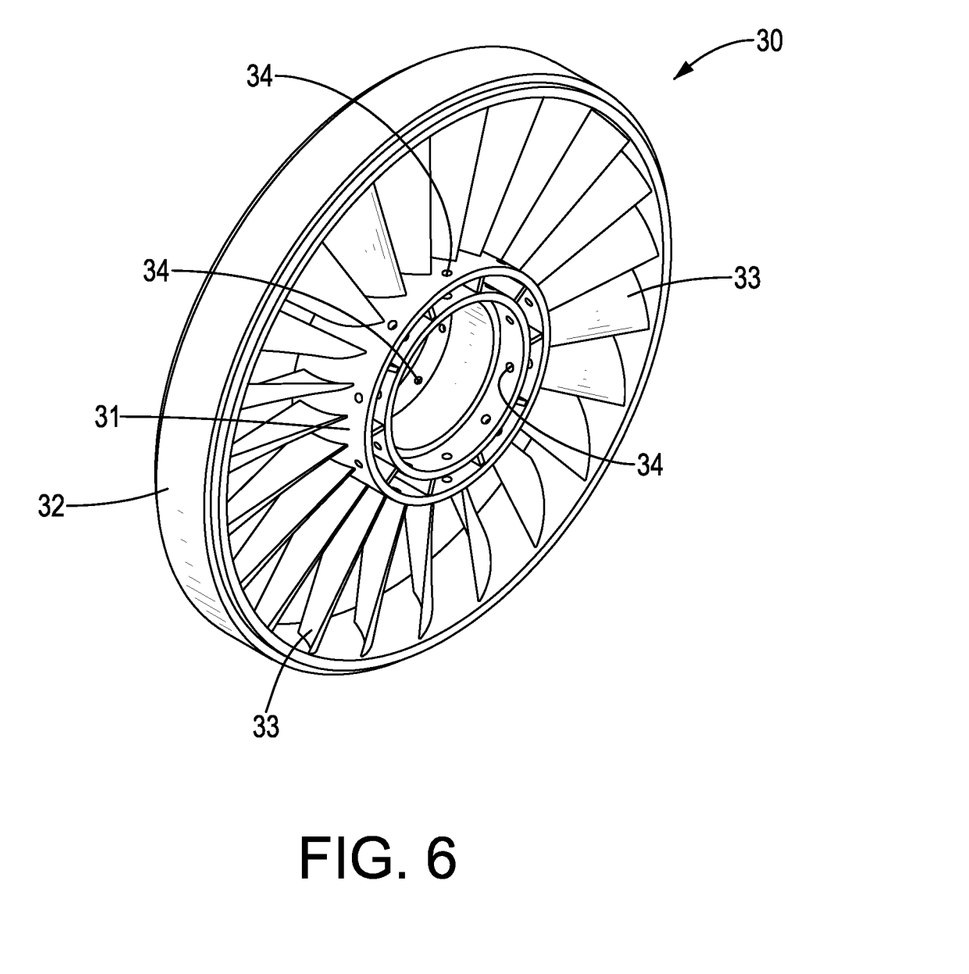
FIG. 6 is a perspective view of a turbo fan of the coupling in FIG. 1.
Figure 7:
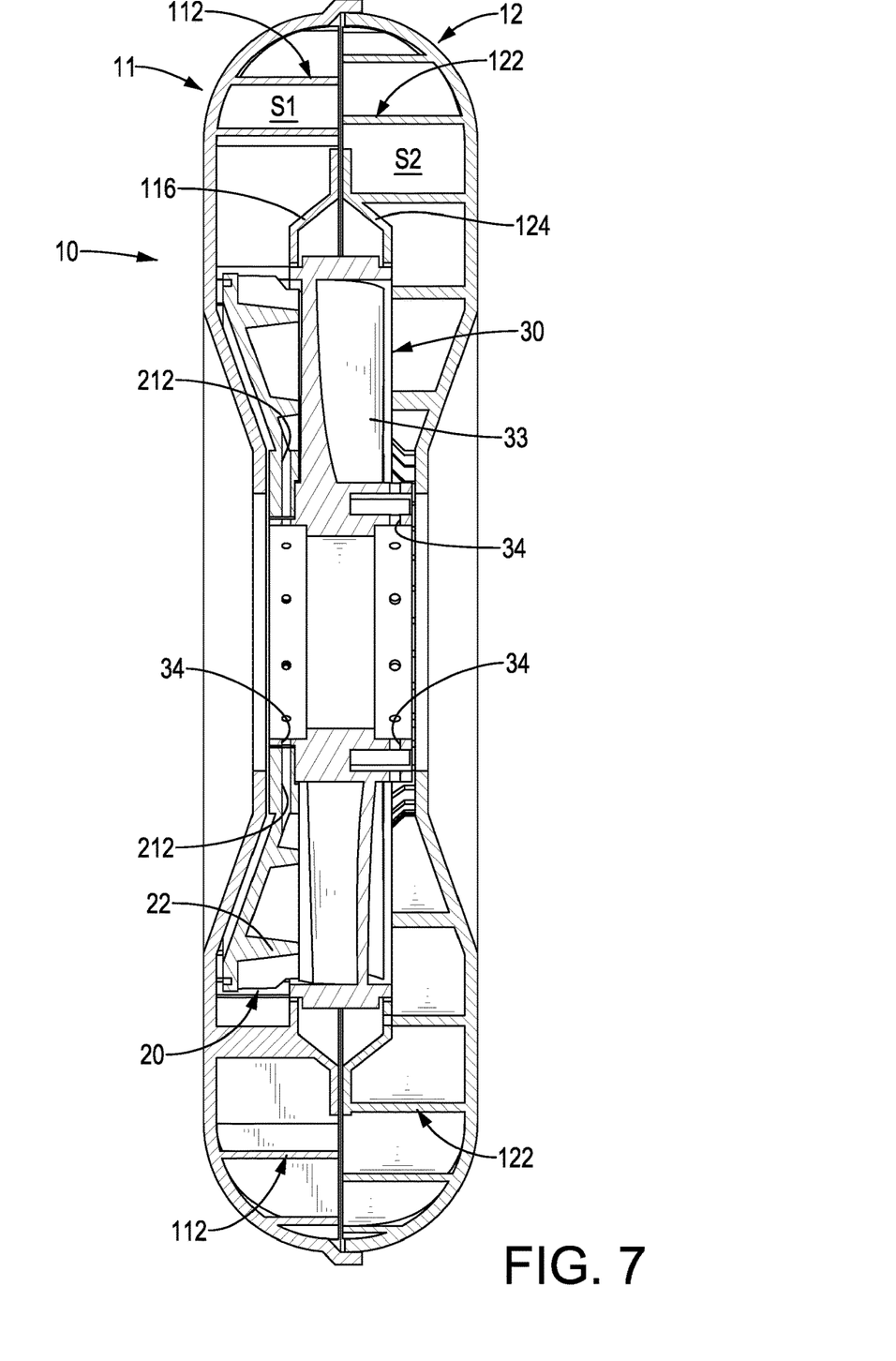
FIG. 7 is a cross-sectional side view of the coupling in FIG. 1.

The multiple guiding ribs 22 surround the communication hole 211. Each guiding rib 22 is formed on the conical surface of the plate 21 and spirally extend from a rim of the plate toward the communication hole 211. A guiding channel is formed between each adjacent two of the multiple guiding ribs 22, converges from the rim of the plate 21 toward the communication hole 211 and fluidly communicates with a corresponding one of the multiple returning holes 212.

With reference to FIGS. 1 to 7, the turbo fan 30 is coaxially disposed within the housing 10, disposed between the first shell 11 and the second shell 12, and coaxially connected to the returning unit 20. In the embodiment of the present invention, multiple bolts are inserted through the returning unit 20 and screwed to the turbo fan 30. The turbo fan 30 has an interior ring 31, an exterior ring 32, multiple blades 33, and multiple through holes 34. The interior ring 31 is circular. The exterior ring 32 is also circular and coaxially surrounds the interior ring 31. The multiple blades 33 surround the interior ring 31. Each blade 33 extends from the interior ring 31 to the exterior ring 32. Some of the multiple through holes 34 surround and are radially defined through the interior ring 31 and fluidly communicate with the second space S2. The other of the multiple through holes 34 surround and are radially defined through the interior ring 31 and fluidly communicate with the multiple returning holes 212.

Figure 8:
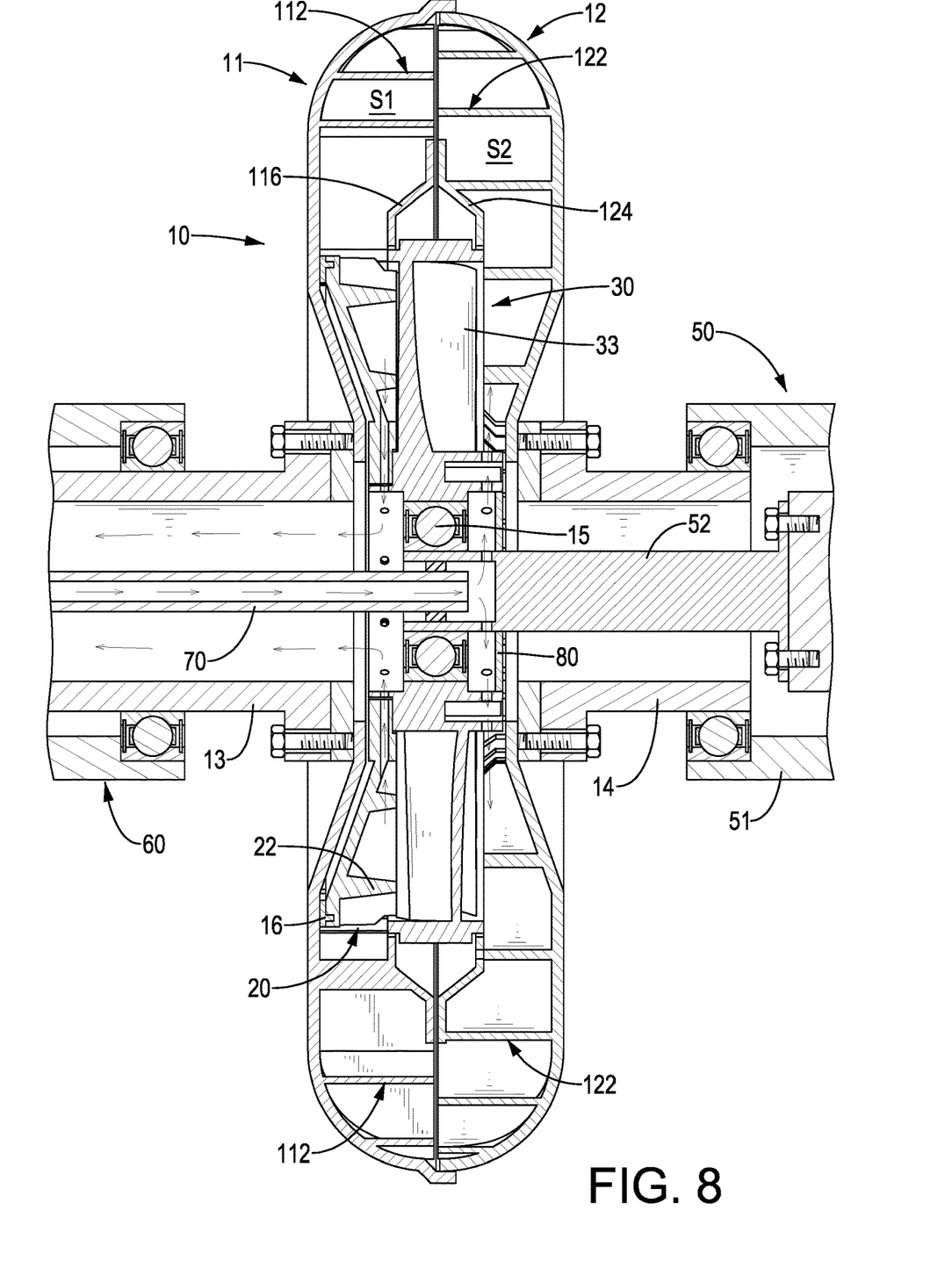
FIG. 8 is an enlarged cross-sectional side view of the coupling in FIG. 1.

With reference to FIG. 8, the coupling in accordance with the present invention further has a first flange 13, a second flange 14, and a bearing 15 for being assembled with a driving device 50, a driven device, an input tube 70, and two sealing units 80. The first flange 13 is coaxially connected to the shell body 111 of the first shell 11. The second flange 14 is coaxially connected to the shell body 121 of the second shell 12. The bearing 15 is coaxially disposed within the interior ring 31 of the turbo fan 30.

The driving device 50 has a motor, a shaft mount 51, and a support shaft 52. The shaft mount 51 and the second flange 14 are connected. The motor is connected to the flange 14 and drives the housing 10 to spin. Practically, the motor may be connected to the second flange 14 via a chain or a belt to laterally drive the second flange 14 and the housing 10 to spin. The support shaft 52 has a hollow free end and multiple bores 521 radially defined through the free end of the support shaft 52. The support shaft 52 is inserted into the second flange 14, the second hole 123 of the second shell 12, and the interior ring 31 of the turbo fan 30. The interior ring 31 of the turbo fan 30 can be directly connected to the support 52 to prevent the turbo fan 30 from rotating with the housing 10.

Meanwhile, the bearing 15 disposed between the interior ring 31 and the support shaft 52 not only prevents the turbo fan 30 from rotating with the housing 10, but also prevent the turbo fan 30 from being damaged by overloaded fluid resistance.

The driven device may have a shaft mount 60, a wheel or a fan. The shaft mount 60 and the first flange 13 are connected. The wheel or the fan of the driven device may be connected to the first flange 13 via a chain or a belt and is driven by the housing 10.

One of two ends of the input tube 70 can fluidly communicate with a pump coaxially connected to the housing 10 for rotating with the housing 10. The other one of the two ends of the input tube 70 is inserted into the first flange 13, the first hole 113 of the first shell 11, and the communication hole 211 of the plate 21 of the returning unit 20, the interior ring 31 of the turbo fan 30, and the free end of the support shaft 52.

One of the two sealing units 80 is sleeved on the input tube 70 and is disposed between the input tube 70 and the free end of the support shaft 52. The other one of the two sealing units 80 is sleeved on the support shaft 52 and is disposed between the support shaft 52 and the interior ring 31.

Figure 9:
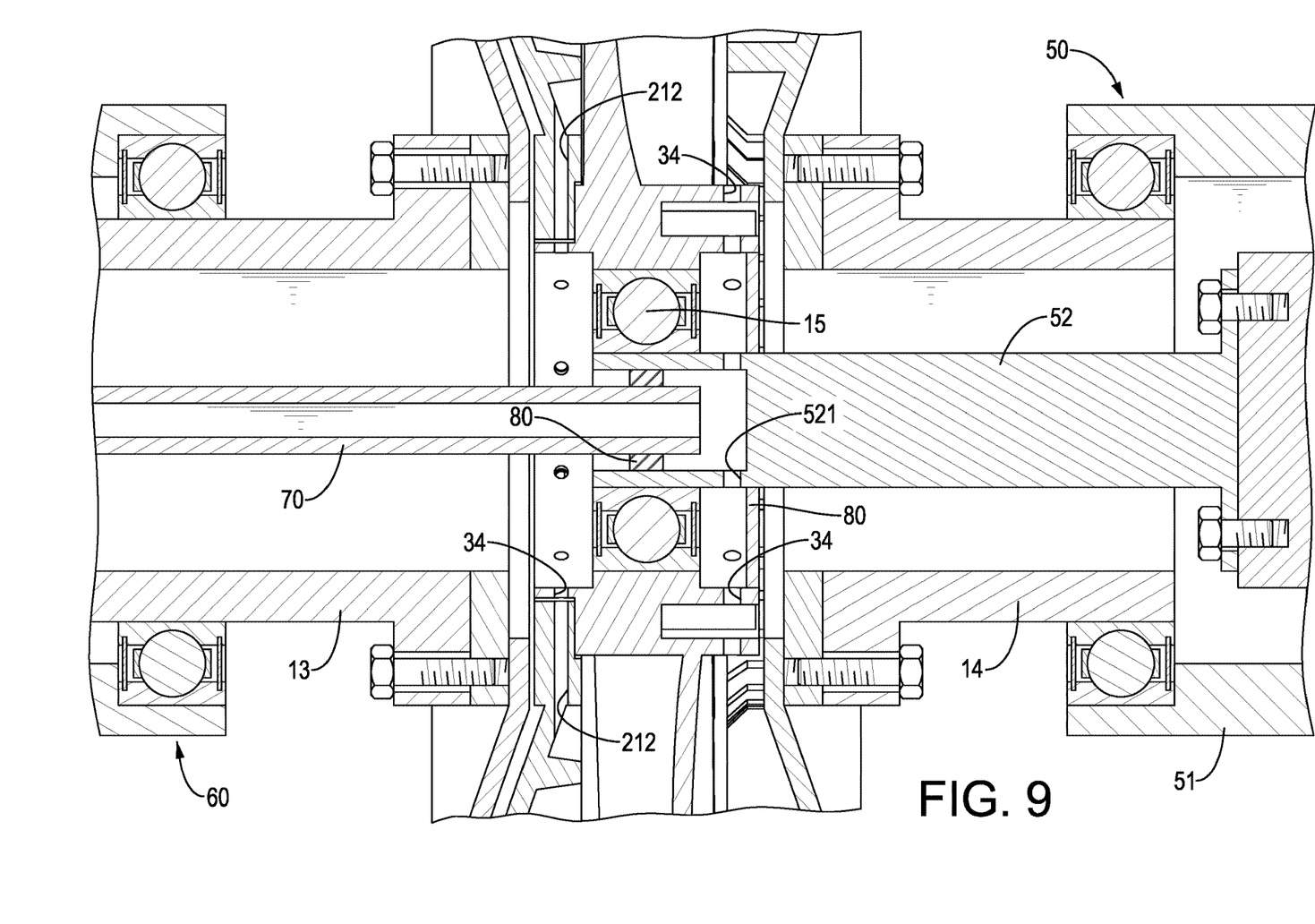
FIG. 9 is another enlarged cross-sectional side view of the coupling in FIG. 1.

With reference to FIGS. 8 and 9, when the motor drives the housing 10 to spin, the pump is driven simultaneously and inputs filtered fluid to the input tube 70. The fluid flows into the interior ring 31 of the turbo fan 30 via the input tube 70. The fluid flows into the second space S2 via said through holes 34 communicating the second space S2. The fluid is guided by the multiple divergent ribs 122 within the second space S2, flows to the rim of the shell body 121 of the second shell 12, and flows into the first space S1. Then, the fluid is guided by the multiple driving ribs 112 and flows to the middle portion of the first shell 11.

Wherein, the included angle between the guiding plate 114 and the driving plate 115 of each driving rib 112 lets the fluid push the driving plate 115 of the driving rib 112. The fluid facilitates the motor to drive the housing 10 to rotate relative to the turbo fan 30. Then the housing 10 drives the wheel or fan of the driven device. Therefore, the coupling of the present invention saves energy consumption of the motor to achieve energy conservation.

Preferably, the bearing 15 is a one way bearing for restricting the turbo fan 30 rotating in a single direction and in a reverse direction of the spinning housing 10. The bearing 15 as a one way bearing can also prevent the turbo fan from being damaged by overloaded fluid resistance.

Preferably, a washer 16 made of Polytetrafluoroethylene (PTFE) can be deployed between the returning unit 20 and the shell body 111 of the first shell 11 to prevent the returning unit 20 rubbing with the first shell 11.

With reference to FIGS. 8 and 9, after pushing the driving plate 115 of each driving rib 112, the fluid has lower dynamic energy. The fluid is guided by the guiding channel formed between two adjacent guiding ribs 22 and flows to the communication hole 211 of the returning unit 20. The fluid is guided by the conical surface of the plate 21 of the returning unit 20 and the multiple guiding ribs 22 and introduced between the interior ring 31 and the exterior ring 32 of the turbo fan 30. Then the fluid is guided by the multiple blades 33 and flows into the second space S2. Eventually, the fluid is introduced into the first space S1 again via the multiple divergent ribs 122 within the second space S2 and pushes the driving plate 115 of each driving rib 112 again.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:
1. A coupling comprising:
   a housing having a first shell and a second shell;
      the first shell having
         a shell body being a cover; and
         a first hole axially defined through a middle portion of the shell body of the first shell;
         a first space disposed within the shell body of the first shell and disposed between a rim of the shell body of the first shell and the first hole; and
         multiple driving ribs disposed in the first space and surrounding the first hole;

each driving rib extending from the rim of the shell body of the first shell toward the first hole and having a guiding plate, a driving plate connected to the guiding plate, and an included angle defined between the guiding plate and the driving plate of the driving rib;

the second shell having
- a shell body being a cover and coaxially connected to the shell body of the first shell; and
- a second hole axially defined through a middle portion of the shell body of the second shell;
- a second space disposed within the shell body of the second shell and disposed between a rim of the shell body of the second shell and the second hole; and
- multiple divergent ribs disposed in the second space and surrounding the second hole;
- each divergent rib spirally extending from the rim of the shell body of the second shell toward the second hole;

a returning unit coaxially disposed within the housing, surrounded by the multiple driving ribs, and having
- a plate having
  - a communication hole axially defined through a middle portion of the plate; and
  - multiple returning holes radially defined through the plate; and
- multiple guiding ribs surrounding the communication hole;
- each of the multiple guiding ribs spirally extending from a rim of the plate toward the communication hole;
- a guiding channel formed between each adjacent two of the multiple guiding ribs and fluidly communicating with a corresponding one of the multiple returning holes; and a turbo fan coaxially disposed within the housing, between the first shell and the second shell, and having
- an interior ring;
- an exterior ring coaxially surrounding the interior ring;
- multiple blades surrounding the interior ring, each of the multiple blades extending from the interior ring to the exterior ring; and
- multiple through holes;
- some of the multiple through holes surrounding and radially defined through the interior ring and communicating with the second space;
- the other of the multiple through holes surrounding and radially defined through the interior ring and communicating with the multiple returning holes;

wherein the first space and the second space fluidly communicate with each other, the first space fluidly communicates with said guiding channel formed between each adjacent two of the multiple guiding ribs; the said guiding channel formed between each adjacent two of the multiple guiding ribs fluidly communicates between the interior ring and the exterior ring; a flowing channel is formed between each adjacent two divergent ribs and fluidly communicates with the second space.

2. The coupling as claimed in claim 1, wherein
the plate of the returning unit has a conical surface facing to the second shell; and
each of the multiple guiding ribs is formed on the conical surface of the plate.

3. The coupling as claimed in claim 2, wherein the coupling has a bearing coaxially disposed within the interior ring of the turbo fan.

4. The coupling as claimed in claim 3, wherein the bearing is a one way bearing.

5. The coupling as claimed in claim 4, wherein
the first shell has a first mediate plate being circular, coaxially surrounding the first hole, connected to the multiple driving ribs, and converging toward the first hole; and
the second shell has a second mediate plate being circular as the first mediate plate, coaxially surrounding the second hole, connected to the multiple divergent ribs, and converging toward the second hole.

6. The coupling as claimed in claim 5, wherein the said guiding channel formed between each adjacent two of the multiple guiding ribs converges from the rim of the plate toward the communication hole.

7. The coupling as claimed in claim 6, wherein the said flow channel formed between each adjacent two of the multiple divergent ribs diverges from the second hole toward the rim of the shell body of the second shell.

8. The coupling as claimed in claim 3, wherein the coupling has a washer disposed between the shell body of the first shell and the returning unit.

9. The coupling as claimed in claim 2, wherein the coupling has a washer disposed between the shell body of the first shell and the returning unit.

10. The coupling as claimed in claim 2, wherein the returning unit and the turbo fan are fixed together.

11. The coupling as claimed in claim 10, wherein a length of the guiding plate of each driving rib is longer than a length of the driving plate of the driving rib.

12. The coupling as claimed in claim 1, wherein the coupling has a bearing being a one way bearing coaxially disposed within the interior ring of the turbo fan.

13. The coupling as claimed in claim 12, wherein the coupling has a washer disposed between the shell body of the first shell and the returning unit.

14. The coupling as claimed in claim 1, wherein
the first shell has a first mediate plate being circular, coaxially surrounding the first hole, connected to the multiple driving ribs, and converging toward the first hole; and
the second shell has a second mediate plate being circular as the first mediate plate, coaxially surrounding the second hole, connected to the multiple divergent ribs, and converging toward the second hole.

15. The coupling as claimed in claim 14, wherein the coupling has a washer disposed between the shell body of the first shell and the returning unit.

16. The coupling as claimed in claim 1, wherein
the said guiding channel formed between each adjacent two of the multiple guiding ribs gradually converges from the rim of the plate toward the communication hole; and
the said flowing channel formed between each adjacent two of the multiple divergent ribs gradually diverges from the second hole toward the rim of the shell body of the second shell.

17. The coupling as claimed in claim 16, wherein the coupling has a washer disposed between the shell body of the first shell and the returning unit.

18. The coupling as claimed in claim 1, wherein the coupling has a washer disposed between the shell body of the first shell and the returning unit.

19. The coupling as claimed in claim 1, wherein the returning unit and the turbo fan are fixed together.

20. The coupling as claimed in claim 1, wherein a length of the guiding plate of each driving rib is longer than a length of the driving plate of the driving rib.

* * * * *